April 18, 1950   M. A. STICELBER   2,504,465
REFRIGERATED DOUGH MIXER

Filed Sept. 6, 1945   2 Sheets-Sheet 1

INVENTOR
MERLIN A. STICELBER
BY Alfred R. Fuchs

INVENTOR
MERLIN A. STICELBER
BY Alfred R. Fuchs

UNITED STATES PATENT OFFICE 2,504,465

REFRIGERATED DOUGH MIXER

Merlin A. Sticelber, Kansas City, Mo., assignor to Stickelber & Sons, Inc., a corporation of Missouri Application September 6, 1945, Serial No. 614,723

1 Claim. (Cl. 257—208)

My invention relates to dough mixers, and more particularly to a refrigerated dough mixer.

It is a purpose of my invention to provide a dough mixer in which the wall portion thereof with which the dough contacts during the mixing operation, or a portion of said wall, is cooled so as to prevent the dough from rising in temperature to a point where the gluten development will be interfered with. While I have provided a dough mixer in which this is accomplished with much greater efficiency than in the ordinary water cooled mixer in the apparatus described in my Patent No. 2,265,552, patented December 9, 1941, by providing a direct expansion coil forming part of the mixing chamber wall or in heat conducting relation thereto, I have found that it is desirable to get the highest efficiency possible out of such an expansion coil, particularly in dough mixers, which are of such a character that the entire wall with which the dough comes in contact can not be refrigerated readily. In dough mixers of the tilting type, the entire wall with which the dough comes in contact during the mixing operation can be cooled if this is found to be desirable in order to maintain the dough below a desired predetermined temperature, as explained in my above referred to patent. However, in dough mixers that are of a non-tilting type, in which a sliding closure is provided that forms part of the wall of the dough mixer during the mixing operation, which is moved out of closing position to permit the dough to be discharged from the mixer when the mixing operation is completed, the area of the wall that can be cooled is reduced considerably below that provided in a dough mixer that has a tiltable mixing chamber.

In my Patent No. 2,274,220 on Refrigerated dough mixers, patented February 24, 1942, and in my Patent No. 2,315,230, patented March 30, 1943, I provide a direct expansion cooling coil on the wall of a dough mixer, which is made up of a plurality of channel members that have the edge portions thereof welded to the wall that is to be cooled to form a direct expansion cooling coil directly on the outer face of the wall of said mixer with which the dough comes in contact during the mixing operation. Due to the fact that the said channel members have to be welded to said wall along their edges, there are areas of the dough mixer wall between adjacent channel members that are not refrigerated by direct contact of refrigerant therewith and do not actually form part of the expansion coil. It is the principal purpose of my invention to provide an expansion coil for a dough mixer wall, or dough mixer wall portion, that will eliminate these wall portions that are not subjected to contact of refrigerant therewith, so that the entire wall that is refrigerated constitutes part of the expansion coil wall.

It is a particular purpose of my invention to provide a refrigerated dough mixer with means for cooling a wall thereof, or a wall portion thereof, comprising a plurality of parallel members channel-shaped in cross section, which are welded to the dough mixer wall and to each other in overlapping arrangement so that one side of the conduit length formed by one of said channel members in combination with the dough mixer wall is overlapped by a portion of the conduit length lying next thereto, said lengths being alternately connected with each other at the opposite ends thereof to provide a circuitous path for the cooling medium flowing through the cooling coil thus provided.

More specifically my invention comprises a cooling coil or expansion coil for a dough mixer wall, comprising a plurality of members channel-shaped in cross section, which have one longitudinal edge of each thereof welded to the dough mixer wall in fluid tight relation, and have the other longitudinal edge thereof welded in fluid tight relation to the outer side of another such channel member, which the said channel member overlaps. The channel members thus each overlap another channel member and are connected with such overlapping channel member and the mixing chamber wall in fluid tight relation so that by providing openings in the wall portions of the overlapped members alternately at opposed ends thereof, a cooling coil or expansion coil is formed on the dough mixer wall portion to which said channel members are secured, which has cooling medium flowing along said wall over the entire area thereof on which said cooling or expansion coil is formed. Instead of providing refrigerated wall portions having no cooling medium flowing along the same, as is the case where adjacent channel members are provided to form the cooling or expansion coil, as in my above referred to patents, No. 2,274,220 and No. 2,315,230.

While my improved cooling coil or expansion coil is particularly adaptable for use where very high cooling efficiency is required due to the limited area to which the expansion coil can be applied, it will also increase the efficiency of the cooling or expansion coil where such area is not limited, but can extend over the whole wall portion of the dough mixer with which dough contacts, as in the case of a tiltable chamber or bowl.

Other objects and advantages of my invention will appear as the description of the drawings proceeds. I desire to have it understood, however, that I do not intend to limit myself to the particular details shown or described, except as defined in the claim.

Figure 1:
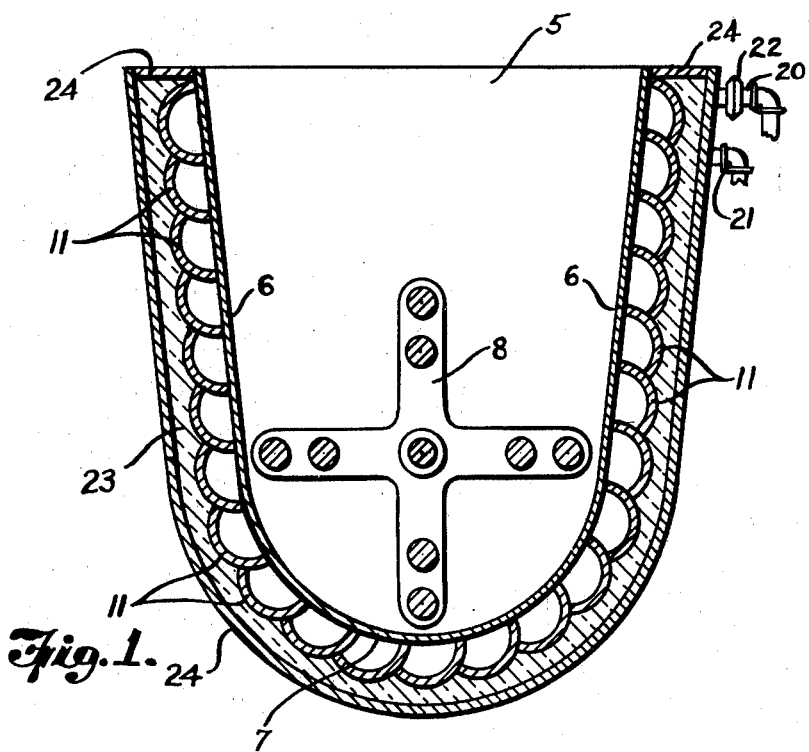
Fig. 1 is a vertical sectional view through a dough mixer bowl of a tiltable type, showing my improved expansion coil applied thereto.
Figure 2:
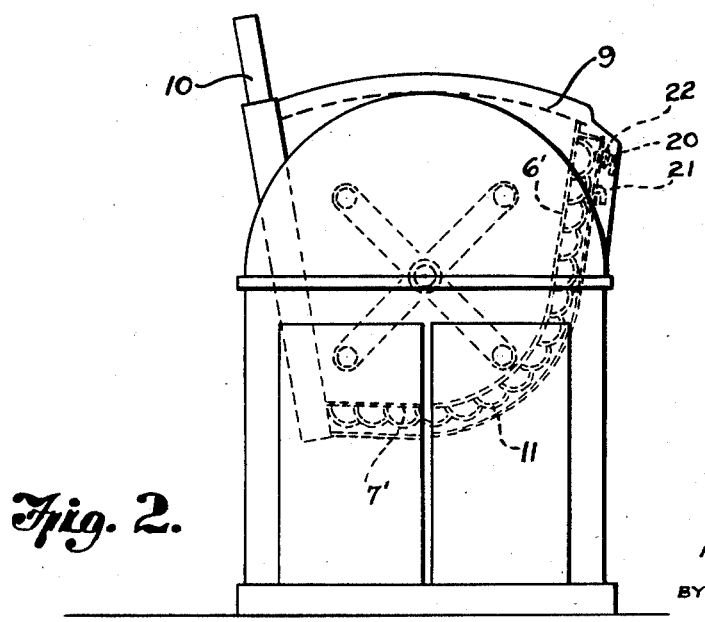
Fig. 2 is a view in side elevation of a dough mixer that has a fixed bowl with a movable wall portion, showing my improved expansion coil applied thereto.

Referring in detail to the drawings, in Fig. 1 is shown a dough mixer having a tiltable bowl having end walls 5, between which is mounted a dough contacting wall made up of the inclined wall portions 6 and a curved wall portion 7 connecting said inclined wall portions. An agitator 8 of any desired type is provided for agitating the contents of the mixer and periodically engaging the same with the dough engaging wall portions of the mixer. In Fig. 2 is shown a dough mixer that has a body portion 9 provided with a mixing chamber of a similar shape to that shown in Fig. 1, having a fixed wall portion that has an inclined portion 6' and a curved portion 7', similar to the portions 6 and 7 of the dough mixer shown in Fig. 1, and a door or closure member 10 that forms the remainder of the dough engaging wall of the mixer when in its closing position. Inasmuch as the door 10 is slidable up and down, it is obviously difficult to provide refrigerating means for the wall portion formed by said door, and it is customary in dough mixers of the type shown in Fig. 2 to provide refrigerating means only for the wall portions 7' and 6'.

Figure 3:
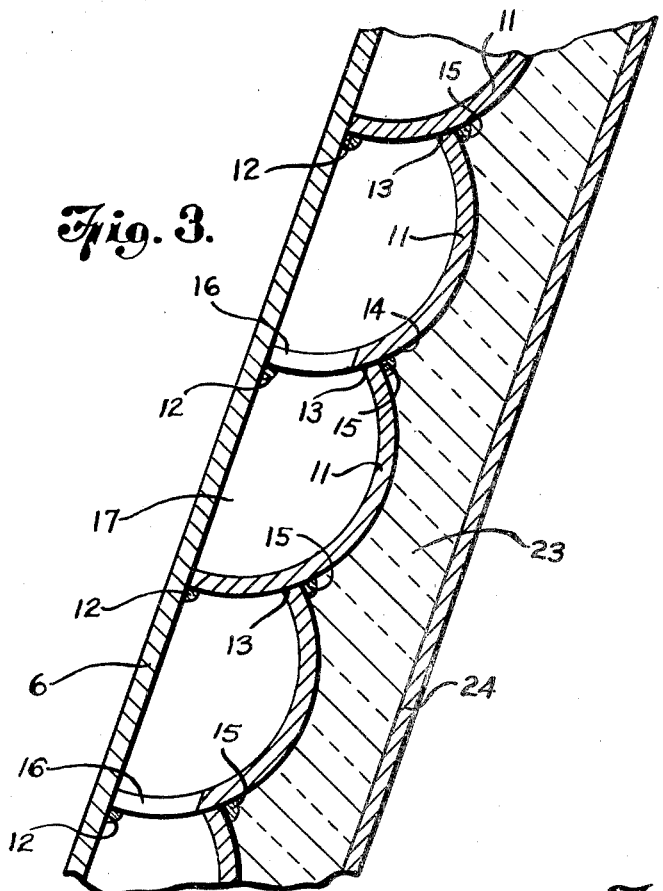
Fig. 3 is a fragmentary sectional view through a portion of my improved expansion coil on an enlarged scale.
Figure 4:
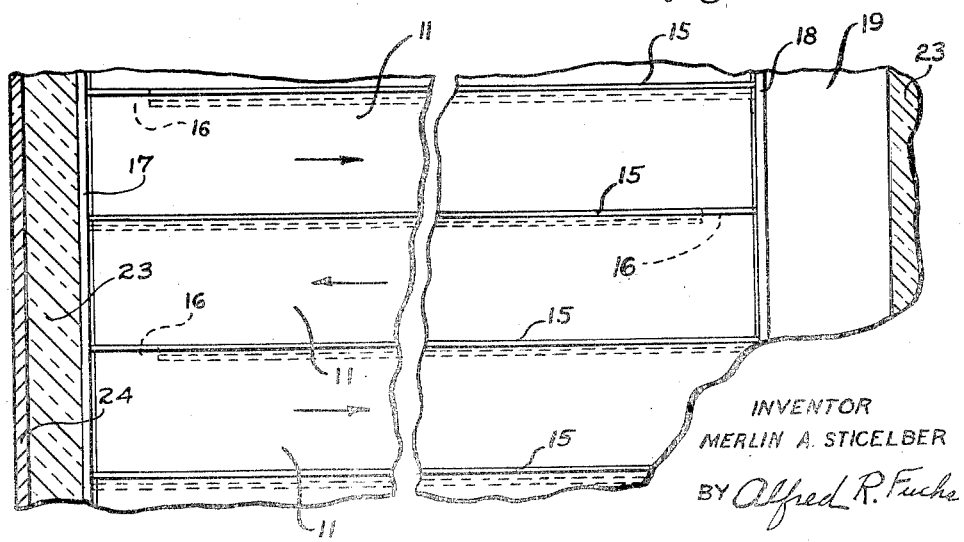
Fig. 4 is a view partly in section through said dough mixer wall portion, showing the cooling or expansion coil in elevation, partly broken away.

Referring to Fig. 3, a dough contacting wall portion 6 is shown, to which channel members 11 are welded along one longitudinal edge thereof, as indicated at 12. The channel members are substantially U-shaped or semi-cylindrical in cross section and arranged in overlapping relation, as shown in Fig. 3, so that the other longitudinal edge 13 of each of said channel members is welded to the outer curved surface 14 of the channel member 11 lying next thereto, said weld being indicated at 15. The underlapping channel member 11 is cut away at one end thereof to provide an opening 16 therein leading into the overlapping channel member. Said cut away portions are provided at only one end of each overlapped channel member and are provided at opposite ends of the channel members that lie next to each other, to thus provide for flow of cooling medium from right to left, as viewed in Fig. 4, through one of the conduits formed by the overlappingly arranged channel members 11 and in the opposite direction through the next adjacent one, as indicated by the arrows in Fig. 4. The end portions of each of the channel members are also welded to an end wall 17 and an end wall 18 to thus close the adjoining runs or lengths of conduit at opposite ends thereof. A channel member similar to the channel members 11, indicated at 19, is provided beyond the one end wall 18 serving as a return conduit into which the last of the parallel lengths 11 empties, said conduit 19 being welded in a well known manner liquid tight to the last channel member of the overlapping interconnected series.

It will be noted upon reference to Fig. 3 that as a result of the overlapping arrangement of channel members 11 provided, all portions of the wall 6 along which the cooling coil or expansion coil lies, of which the dough mixer wall forms a part, will be contacted by the cooling medium flowing through the parallel lengths of the cooling coil provided by this construction, except for the very small areas where the edge portion of a channel 11 is welded to said wall of the dough mixer. These areas will be so exceedingly small and will be in heat conducting relation to the walls of the channel members 11, which are also contacted by the cooling medium throughout their inner faces, that the entire wall area over which the cooling coil extends will be subjected to substantially the same cooling action by refrigerant or cooling medium flowing through the cooling coil or expansion coil.

In providing my improved cooling coil made up of the overlapping channel members 11 on a dough mixer of the type shown in Fig. 1, said channel members are welded to each other and to the wall portions 6 and 7 in the manner illustrated in Fig. 1 to provide a continuous cooling coil having adjoining lengths of the conduit alternately connected together at opposite ends thereof to provide a circuitous path for the refrigerant or other cooling medium from the refrigerant inlet connection 20 to the return conduit 19, which is connected with the return or suction connection 21. If the cooling coil is an expansion coil, an expansion device 22 is provided in the inlet connection 20 in a well known manner. The cooling coil is provided with a heat insulating covering 23 and an outer metallic covering 24 over the heat insulating covering in a well known manner. In the form of dough mixer shown in Fig. 2 the cooling coil or expansion coil made up of the overlapping channel members 11 is provided along the wall portions 6' and 7', as illustrated in Fig. 2, and is provided with the connections for the supply of refrigerant thereto and return of refrigerant therefrom, as above described, the same reference numerals being applied to these parts in Fig. 2 as in Fig. 1.

Preferably, my improved refrigerated dough mixer is cooled by means of a direct expansion coil made in the manner above described. However, the same advantages would exist, to the extent of the capabilities of the cooling medium, if brine or other cooling liquid were utilized in a cooling coil made in the manner above described.

What I claim is:

In a dough mixer, a mixing chamber having a refrigerated wall portion, and refrigerating means for said wall portion comprising a plurality of straight, parallel, transversely curved refrigerant conduits channel shaped in cross section, said conduits each having one marginal edge thereof secured to said wall portion and having the other marginal edge thereof secured in overlapping relation to the conduit adjacent thereto, alternate conduits at one end thereof each having an opening in the wall thereof overlapped by the conduit secured thereto and the conduits alternating therewith at the other end thereof each having an opening in the wall thereof overlapped by the conduit secured thereto to connect all said conduits alternately at opposite ends thereof in series, end walls extending transversely to said conduits and secured thereto in fluid tight relation, and means cooperating with one of said end walls to provide a conduit extending along said wall portion at one end of said conduits and transversely thereof, said parallel conduits being imperforate except for said openings at the ends thereof to provide a single circuitous passage for refrigerant along said wall, one end of said passage being connected with said transversely extending conduit.

MERLIN A. STICELBER.

REFERENCES CITED

The following references are of record in the file of this patent:

UNITED STATES PATENTS

| Number | Name | Date |
|---|---|---|
| 2,136,992 | Heynssens | Nov. 15, 1938 |
| 2,265,552 | Sticelber | Dec. 9, 1941 |
| 2,370,612 | Lornitzo | Feb. 27, 1945 |

FOREIGN PATENTS

| Number | Country | Date |
|---|---|---|
| 484,953 | Great Britain | May 12, 1938 |
| 635,970 | Germany | Oct. 1, 1936 |